B. F. MILLER.

Improvement in Ventilators.

No. 115,339.             Patented May 30, 1871.

Witnesses:
Chas. H. Smith
Harold Serrell

Benjamin F. Miller,
Lemuel W. Serrell
Atty.

115,339

UNITED STATES PATENT OFFICE.

BENJAMIN F. MILLER, OF NEW YORK, N. Y.

IMPROVEMENT IN VENTILATORS.

Specification forming part of Letters Patent No. 115,339, dated May 30, 1871.

*To all whom it may concern:*

Be it known that I, BENJAMIN F. MILLER, of the city and State of New York, have invented and made an Improvement in Ventilators; and the following is declared to be a correct description of the same.

In Letters Patent granted to me October 2, 1865, No. 13,620, a ventilator is shown in which there is a cone over the ascending-flue and within an inclosing-case, whereby the passage of currents of cold air into the chimney is prevented and the downward currents are deflected. I combine with the said cone or disk a conical perforated casing around the upper end of the chimney.

I have discovered that a metallic perforated cone deflects currents of air and prevents the atmosphere blowing into the chimney, because the wind, striking the surface of the cone, is deflected therefrom, and the deflected current crossing the openings or perforations is sufficiently powerful to divert the whole or a large portion of the currents of air which would otherwise pass directly into the perforations, and the openings on the side against which the wind does not blow act to give a very free vent to the gases or products of combustion. Furthermore, by combining with the said perforated casing the cone or disk over the chimney-flue, the operation is rendered much more perfect and complete, so that warmth is maintained in the chimney.

Figure 1:
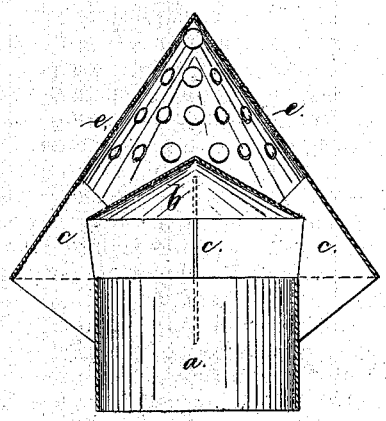
Figure 2:
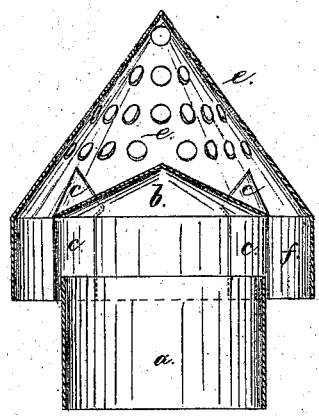
Figure 3:
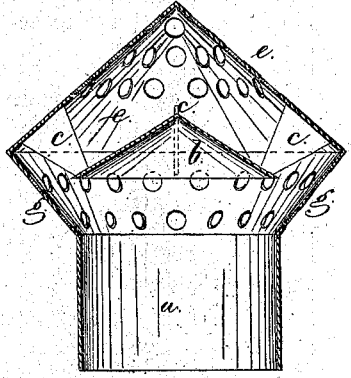
Figure 4:
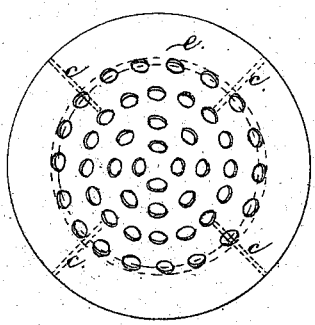

In the drawing, Figures 1, 2, and 3 are vertical sections of my said ventilators in the varying forms in which I make use of the same; and Fig. 4 is a plan of the perforated cone.

The flue *a* is of any suitable size or shape, and above it the cone or disk *b* is sustained by vertical plates or tie-bars or strips *c c*. There should be sufficient distance between the plate or cone and the upper end of the flue to allow a free escape equal to the sectional area of the flue *a*. Around the upper end of the flue *a* and the disk or cone *b* is the perforated cone *e*, the openings in which are numerous; and I prefer that said openings should be round; but the same might be elongated or ornamental. The cone may extend around the upper end of the flue *a* in the shape shown in Fig. 1; or it may be contracted to a cylindrical skirt, *f*, Fig. 2; or our inverted perforated truncated cone *g*, Fig. 3; in either instance furnishing downward openings for the escape of gases or vapors, especially when the wind tends to blow down the flue. In all instances the currents of air blowing against the cone are deflected, and but little wind can pass into the openings, because the deflected currents divert those that would otherwise pass directly into the openings.

I claim as my invention—

The combination of the perforated casing with the inclosed disk, pyramid, or cone, and the flue-pipe *a*, substantially as and for the purposes set forth.

Signed by me this 11th day of April, 1871.

B. F. MILLER.

Witnesses:
CHAS. H. SMITH,
GEO. T. PINCKNEY.